(12) United States Patent
Matocha et al.

(10) Patent No.: US 6,784,430 B2
(45) Date of Patent: Aug. 31, 2004

(54) INTERDIGITATED FLAME SENSOR, SYSTEM AND METHOD

(75) Inventors: Kevin S. Matocha, Troy, NY (US); Jeffrey B. Fedison, Niskayuna, NY (US); James W. Kretchmer, Ballston Spa, NY (US); Dale M. Brown, Schenectady, NY (US); Peter M. Sandvik, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 10/277,940

(22) Filed: Oct. 23, 2002

(65) Prior Publication Data

US 2003/0080294 A1 May 1, 2003

Related U.S. Application Data

(63) Continuation-in-part of application No. 09/793,432, filed on Feb. 27, 2001, now Pat. No. 6,646,265, which is a continuation-in-part of application No. 09/246,861, filed on Feb. 8, 1999, now Pat. No. 6,239,434.

(51) Int. Cl.[7] .......................... H01L 27/14; G02B 5/28
(52) U.S. Cl. .............................. 250/339.15; 250/370.01
(58) Field of Search ................. 250/339.15, 370.01, 250/370.14, 370.15, 372; 257/459, 466, 477

(56) References Cited

U.S. PATENT DOCUMENTS

| | | | | |
|---|---|---|---|---|
| 4,087,833 A | * | 5/1978 | Tseng .......................... 257/230 |
| 5,093,576 A | * | 3/1992 | Edmond et al. ........ 250/370.01 |
| 5,125,739 A | * | 6/1992 | Suarez-Gonzalez et al. .. 356/45 |
| 5,182,670 A | * | 1/1993 | Khan et al. .................. 359/359 |
| 5,186,146 A | * | 2/1993 | Sohma et al. .......... 123/406.28 |
| 5,249,954 A | * | 10/1993 | Allen et al. .................... 431/14 |

(List continued on next page.)

OTHER PUBLICATIONS

Brown et al., U.S. patent application Publication No. US 2001/0009268, Jul. 26, 2001.
Glasgow, Optoelectronic Technologies for Remote Sensing from Space, Proceedings of SPIE, The International Societyfor Optical Engineering, V. 868, pp. 40–45 (Jun. 26, 2002).
Carrano et al., Very low dark current metal—semiconductor—metal ultravioulet photodetectors fabricated on single-crystal GaN eptitaxial layers, Appl. Phys. Lett. 70 (15), Apr. 14, 1997.
Brown et al., Silicon Carbide UV Photodiodes, IEEE Trans. Elect. Dev. V. 40, 325 (1993).

Primary Examiner—Constantine Hannaher
Assistant Examiner—Otilia Gabor
(74) Attorney, Agent, or Firm—Ernest G. Cusick; Philip D. Freedman (57) ABSTRACT

A flame sensor for combustion flame temperature determination comprises elongated extensions that are positioned with parallel interdigitated longitudinal axis with respect to one another. An optical spectrometer comprises the sensor and a system comprises the sensor. A method for combustion flame temperature determination comprises obtaining a first photodiode signal and a second photodiode signal by using photodiode devices comprising photodiodes with elongated extending interdigitated digits. A method of fabricating a flame sensor for combustion flame temperature determination, comprises forming first and second photodiodes with elongated extending interdigitated digits.

18 Claims, 5 Drawing Sheets

U.S. PATENT DOCUMENTS

| | | |
|---|---|---|
| 5,257,496 A | 11/1993 | Brown et al. |
| 5,303,684 A | 4/1994 | Brown et al. |
| 5,339,070 A * | 8/1994 | Yalowitz et al. ............ 340/578 |
| 5,394,005 A | 2/1995 | Brown et al. |
| 5,467,185 A | 11/1995 | Engeler et al. |
| 5,480,298 A | 1/1996 | Brown |
| 5,544,478 A | 8/1996 | Shu et al. |
| 5,581,087 A | 12/1996 | Uddin et al. |
| 5,589,682 A * | 12/1996 | Brown et al. ........... 250/214 A |
| 5,659,133 A * | 8/1997 | Sims et al. .................... 73/116 |
| 5,773,826 A * | 6/1998 | Castleman et al. .... 250/339.15 |
| 5,834,331 A * | 11/1998 | Razeghi ....................... 438/40 |
| 6,013,919 A | 1/2000 | Schneider |
| 6,057,917 A | 5/2000 | Petersen et al. |
| 6,156,581 A * | 12/2000 | Vaudo et al. ................. 438/22 |
| 6,166,647 A * | 12/2000 | Wong ........................ 340/628 |
| 6,239,434 B1 | 5/2001 | Brown |
| 6,350,988 B1 | 2/2002 | Brown |

* cited by examiner

INTERDIGITATED FLAME SENSOR, SYSTEM AND METHOD

This Application is a Continuation-in-Part of commonly assigned Brown et al., U.S. application Ser. No. 09/793,432, filed Feb. 27, 2001, Publication No. 20010009268 now U.S. Pat. No. 6,646,265, which is a Continuation-in-Part of commonly assigned Brown, U.S. application Ser. No. 09/246,861, filed Feb. 8, 1999, now U.S. Pat. No. 6,239,434.

This invention was made with government support under Contract No. DE-FC2601NT41021 awarded by DOE. The government may have certain rights in the invention.

BACKGROUND OF THE INVENTION

The invention relates to a sensor and system for controlling emissions in an internal combustion engine and, more particularly, to use of a silicon carbide sensor to measure flame temperature of an internal combustion engine for controlling fuel injection.

Unnecessarily high turbine engine combustion temperatures can compromise fuel efficiency and increase emission pollution. For example, in a gas turbine designed to emit nine nitrogen oxide ($NO_x$) particles per million (ppm), an increase from 2730° F. (1499° C.) to 2740° F. (1504° C.) reduces turbine efficiency by about two percent and increases $NO_x$ emissions by about two ppm. On an annual basis, this can amount to millions of dollars of lost revenue and to several tons increase in $NO_x$ emission.

A flame detector can be used in the turbine engine to detect initial flame during start up and then to control engine combustion and consequently to control $NO_x$ emissions. Typically, the flame detector is based on a silicon carbide (SiC) photodiode that senses electromagnetic radiation having a wavelength in the range of from about 190–400 nanometers, which is within the ultraviolet (UV) range. The photodiode generates a current (or "photocurrent") proportional to the ultraviolet light intensity to which it is exposed. The output of the photodiode is amplified by signal conditioning circuitry to produce an electrical signal (either a voltage or a current) indicative of the intensity of a flame.

A SiC based photodiode is particularly advantageous for sensing flame temperature of an engine. The SiC exists in a relatively large number of different crystalline structures or forms, of which the 6H form and the 4H form (with "H" representing hexagonal crystalline packing) are the most readily available. Advantageously, the 6H form and the 4H form exhibit relatively wide band gaps of approximately 3 electron volts (eV). The wide band gap provides sensitivity to ultraviolet radiation, as well as low leakage current. A typical silicon diode operating at 300° C. exhibits leakage current on the order of 10 $mA/cm^2$, while a 6H or 4H silicon carbide diode operating at the same temperature exhibits leakage current on the order of 1–10 $pA/cm^2$, which is advantageously some six orders of magnitude less. This lower current leakage leads to lower noise, lower amplifier offset, and larger dynamic range (or operating range), thereby providing for the use, for example, of larger amplifier gains for the detection of a small number of UV photons required for initial flame detection during startup.

A 6H or a 4H silicon carbide photodiode begins to exhibit optical sensitivity to applied light at wavelengths of approximately 400 nm and exhibits a peak response at approximately 270 nm, depending on the thickness of the photodiode epitaxial layers. Hence, a 6H or 4H silicon carbide photodiode is substantially transparent to both infrared and visible light. Accordingly, a SiC detector can readily discern ultraviolet radiation that exists in the presence of a strong background of intense infrared and/or visible light. Hence, a SiC detector is a suitable high temperature turbine engine flame sensor, readily responding to ultraviolet emission produced in a jet engine while effectively ignoring all the infrared and visible radiation emitted by the heated parts of the engine.

The OH molecules in combustion flames have emission characteristics that reflect combustion flame temperature. The OH emission band is essentially isolated from weaker emission lines produced by other excited radicals. The SiC photodiode responsivity overlaps a hydrocarbon flame's strong OH band at 310 nm. Hence, a SiC diode can be used to detect even dim flames by detecting the strong OH band without being blinded by black body radiation from hot combustor walls.

Typically, a silicon carbide diode is manufactured using epitaxial growth beginning with either a 6H n or p type conductive substrate. If an n type conductive substrate is used, then a heavily doped p+ layer is epitaxially grown over the substrate. A lightly aluminum doped p type layer is then grown over the p+ layer. Alternatively, if a p type substrate is used, then the p– layer is grown directly over the substrate. Owing to the relatively low optical coefficient of absorption of silicon carbide, a relatively thick p– layer can be used to increase photodiode sensitivity to long ultraviolet wavelengths or the p– layer can be made relatively thin to decrease diode sensitivity to long ultraviolet wavelengths and thus to decrease its sensitivity to solar radiation occurring between 300 and 400 nm. Next, a nitrogen doped n+ layer can be epitaxially grown at a uniform thickness over the p– layer. A metallic contact can be formed on top of the n+ layer. Also, a metallic contact can be made to the back side of the p type substrate, or if an n type substrate is used, to an exposed portion of the top of the p+ layer.

Commonly assigned Brown, U.S. Pat. No. 6,350,988 patent teaches an optical spectrometer for combustion flame temperature determination. The spectrometer comprises at least two photodetectors positioned for receiving light from a combustion flame and having different overlapping optical bandwidths for producing respective output signals. The spectrometer includes a computer for obtaining a difference between a first respective output signal of a first one of the at least two photodetectors and a second respective output signal of a second one of the at least two photodetectors, dividing the difference by one of the first and second respective output signals to obtain a normalized output signal and using the normalized output signal to determine the combustion flame temperature.

Copending commonly assigned Brown et al., U.S. application Ser. No. 09/793,432, filed Feb. 1, 2001, Publication No. 20010009268 teaches a dual diode SiC flame temperature sensor for combustion control systems with low dark current. The sensor has a flame temperature accuracy within about 20° F. (11° C.) in the temperature range of about 2500° F. (1371° C.) to about 3500° F. (1927° C.). The sensor comprises: a first photodiode device for obtaining a first photodiode signal, the first photodiode device comprising a silicon carbide photodiode and having a range of optical responsivity within an OH band; a second photodiode device for obtaining a second photodiode signal, the second photodiode device comprising a silicon carbide photodiode and a filter, the second photodiode device having a range of optical responsivity in a different and overlapping portion of the OH band than the first photodiode device; and a computer for obtaining a ratio using the first and second photodiode signals and using the ratio to determine the combustion flame temperature.

While the dual diode sensors of the Brown patent and Brown et al. application are improved, there is always a need for a photodiode with further improved light collection and sensitivity. Additionally, there is a need for a dual photodiode with minimum cross talk.

BRIEF DESCRIPTION OF THE INVENTION

The present invention provides a dual diode type sensor with the desired improved light collection and measurement accuracy and minimum cross talk. In a first embodiment, the invention is a flame sensor for combustion flame temperature determination, comprising a first photodiode formed with elongated extending digits, and having a range of optical responsivity within an OH band for producing a first output signal; and a second photodiode formed with elongated extending digits, and having a range of optical responsivity in a different and overlapping portion of the OH band than the first photodiode device OH band for producing a second output signal; wherein the elongated extensions are positioned with parallel interdigitated longitudinal axis with respect to one another. The invention also includes an optical spectrometer that comprises the sensor and a system that comprises the sensor.

In another embodiment, the invention relates to a method for combustion flame temperature determination comprising: obtaining a first photodiode signal using a first photodiode device comprising a silicon carbide photodiode with elongated extending digits and having a range of optical responsivity within an OH band; obtaining a second photodiode signal by using a second photodiode device comprising a silicon carbide photodiode with elongated extending digits interdigitated with the elongated extending digits of the first photodiode and a filter, the second photodiode device having a range of optical responsivity in a different and overlapping portion of the OH band than the first photodiode device; and obtaining a ratio using the first and second photodiode signals and using the ratio to determine the combustion flame temperature.

Another embodiment relates to a method of fabricating a flame sensor for combustion flame temperature determination, comprising forming a first photodiode with elongated extending digits and having a range of optical responsivity within an OH band for producing a first output signal; forming a second photodiode with elongated extending digits and having a range of optical responsivity in a different and overlapping portion of the OH band than the first photodiode device OH band for producing a second output signal; and positioning the elongated digits of the first photodiode and the second photodiode with parallel interdigitated longitudinal axis with respect to one another.

DETAILED DESCRIPTION OF THE INVENTION

The invention provides an optimized, interdigitated design geometry that can be used with SiC flame sensors disclosed and described in parent commonly assigned Brown et al., U.S. application Ser. No. 09/793,432, filed Feb. 1, 2001, Publication No. 20010009268, which is a Continuation-in Part of commonly assigned Brown, U.S. application Ser. No. 09/246,861, filed Feb. 8, 1999, now U.S. Pat. No. 6,239,434. The flame sensor in-situ determines the temperature of a combustion flame from detection of UV radiation. The invention allows an optimal collection of that UV light by using an interdigitated shaped geometry. The interdigitated structure provides improved light collection by targeting the sensitivity to the exponential, spatial distribution of light with minimized cross talk or unintentional mixing of electrical signals between photodiodes resulting from inadequate photodiode spacing.

Features of the invention will become apparent from the drawings and following detailed discussion, which by way of example without limitation describe a preferred embodiment of the present invention.

Figure 1:
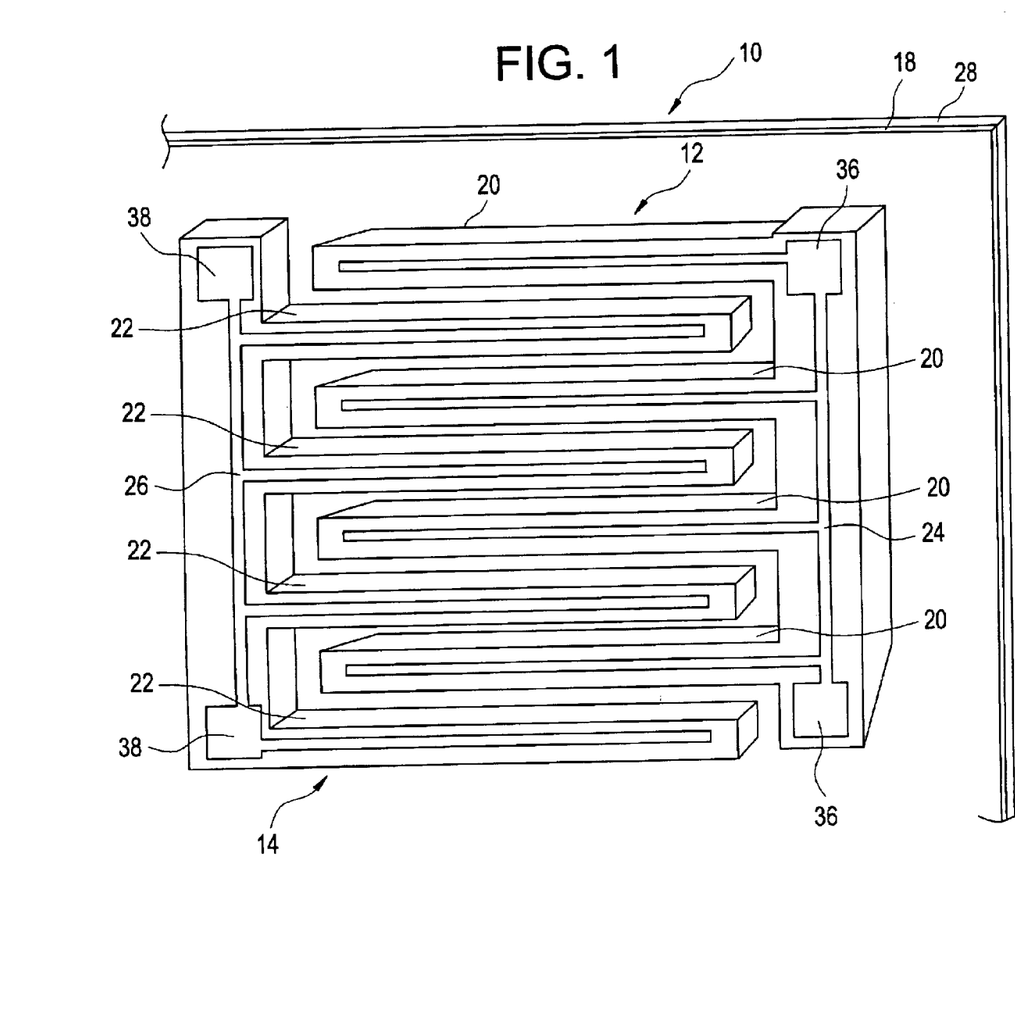
FIG. 1 is a schematic perspective view of a sensor.
Figure 2:
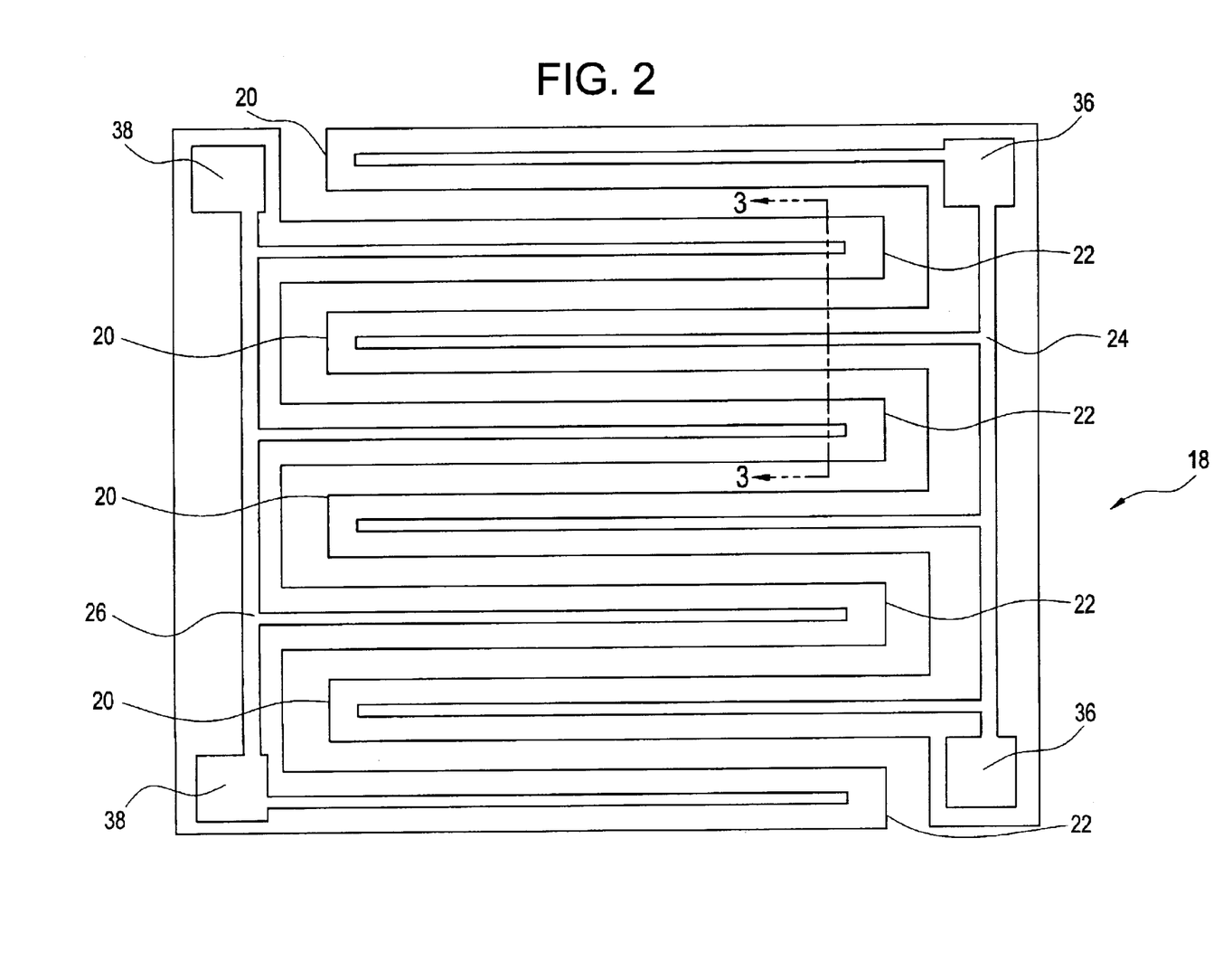
FIG. 2 is a plan view of the sensor.
Figure 3:
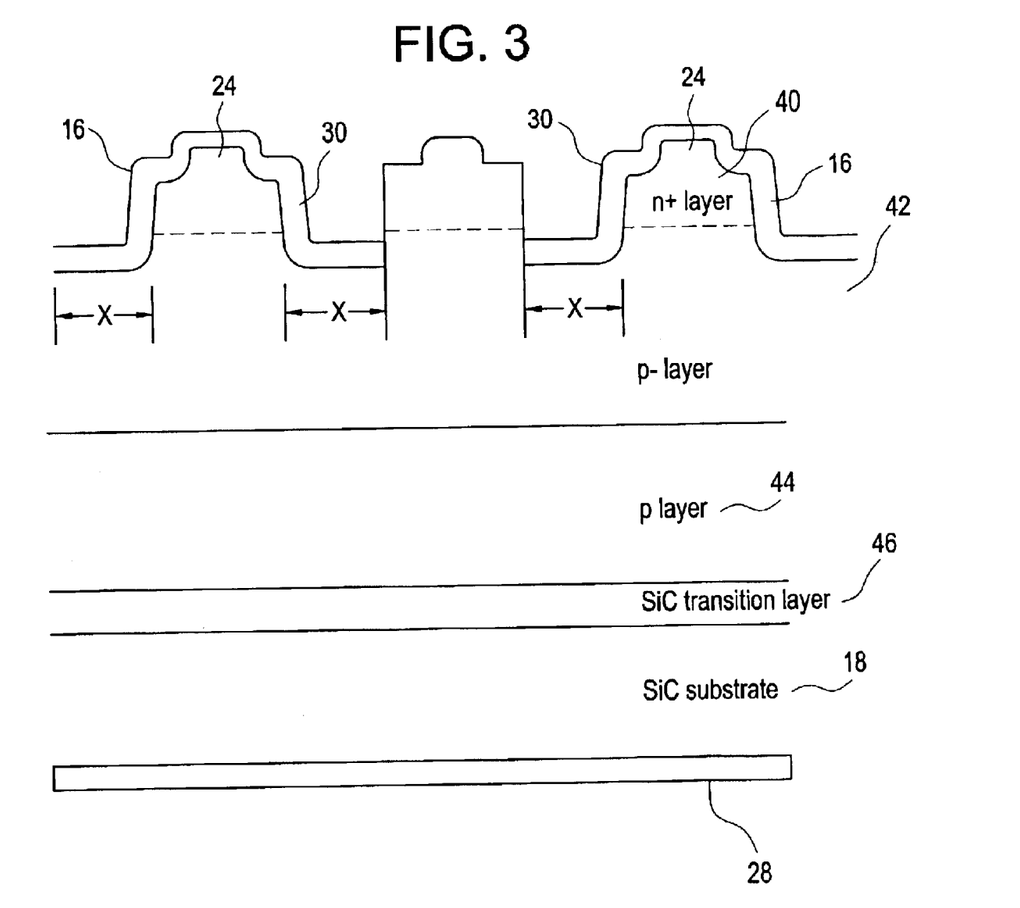
FIG. 3 is a cut away side view of the sensor taken along the line A—A of FIG. 2.

FIG. 1 is a schematic perspective view of an embodiment of the invention flame sensor. FIG. 2 is a plan view of the sensor and FIG. 3 is a cut away view through line A—A of FIG. 2. In the figures, a flame sensor 10 for combustion flame temperature determination comprises a first photodiode 12 formed on substrate 18 for obtaining a first photodiode signal and a second photodiode 14 formed on substrate 18 for obtaining a second signal. In the embodiment, the diodes are silicon carbide photodiodes with a range of optical responsivity in an OH band. The second photodiode 14 is associated with filter 16, shown in FIG. 3. The second photodiode 14 has a range of optional responsivity in a different and overlapping portion of the OH band than the OH band portion of the first photodiode 12.

The first photodiode 12 comprises elongated extending digits 20 positioned for receiving light from a combustion flame. Photodiode 12 has a range of optical responsivity within an OH band for producing a first output signal. The second photodiode 14 comprises elongated extending digits 22 that are interlocked, i.e., "interdigitated" with the digits 20 of the first photodiode 12. Second photodiode 14 has a range of optical responsivity in a different and overlapping portion of the OH band than first photodiode 12. In a more specific embodiment, the first photodiode 12 produces a signal that is a measure of the total intensity of the OH band whereas the second photodiode 14 produces a signal that intersects the OH band and thereby allows for partitioning of the band. A ratio of these measurements can be used to determine flame temperature.

Further shown are cathodes 24 and 26, which are functional sections of respective digits 20, 22. Anode 28 is located on the back side of the wafer substrate 18. The interdigitated photodiodes 12, 14 can use a common anode 28 to reduce structure complexity and to simplify fabrication. Or, if desired, the cathodes 24, 26 and anode 28 can be switched.

Several types of semiconductor materials can be used in the interdigitated sensor 10. Suitable materials include silicon carbide (SiC), aluminum gallium nitride (AlGaN), aluminum indium gallium nitride (AlInGaN), gallium nitride (GaN), silicon (Si) when used with a phosphor to convert UV light to visible light and gallium arsenide phosphide (GaAsP). Other suitable high temperature flame sensor materials include AlGaN, AlInGaN, GaN and GaAsP. Gallium nitride (GaN, bandgap $E_g=3.4$ eV) has a maximum wavelength of absorption of about 364 nanometers (nm). That is, GaN is transparent for wavelengths longer than 364 nm. Aluminum nitride (AlN, $E_g=6.2$) has a maximum wavelength of absorption of about 200 nanometers. A class of alloys of GaN and AlN designated $Al_xGa_{x1}N$ ($0 \leq x \leq 1$), are direct bandgap materials with bandgaps variable between the extremes of GaN and AlN depending on the amount of aluminum in the alloy. Indium (In) may also be added to form $Al_xIn_yGa_{l-x-y}N$ ($0 \leq x, y \leq 1$), which extends the bandgap range from 200 run to approximately 650 nm.

The OH emission band at wavelengths centered near 308 and 309 nanometers (nm) (or, more broadly, within the range of about 260 nm to about 350 nm) includes a series of fine emission lines. These emission lines are products of various rotational and vibrational transitions between OH molecule energy levels. These lines are emission characteristics that reflect a combustion flame temperature. A SiC responsivity overlaps the OH emission wavelength at 310 nm. Hence, a SiC photodiode is particularly preferred for sensing a hydrocarbon flame. Additionally, because SiC becomes transparent at about 400 nm, black body radiation from hot combustor walls does not blind or interfere with the detection of even dim flames. The OH emission band is essentially isolated from weaker emission lines produced by other excited radicals within a combustion flame.

Wide bandgap (Eg≈3ev) SiC photodiodes typically have responsivities of at least 50 mA/Watt for ultraviolet wavelengths between 200 nanometers (nm) and 350 nm with a responsivity peak at 270 nm of 150 mA/Watt. At 400 nm, the responsivity falls towards zero because the wide bandgap eliminates any possibility of photon absorption for longer wavelengths. SiC photodiode dark current at 482° F. (250° C.) is very low and is typically no greater than 1 pA/cm$^2$ at one volt reverse bias with an internal impedance of 10$^{14}$ ohms, for example. Additionally, SiC photodiode fabrication techniques have higher yields than present gallium nitride photodiode fabrication techniques. Another advantage of an SiC photodiode is that the responsivity is relatively insensitive to device structure so long as the p-type epitaxial layer of the photodiode is sufficiently thick (greater than or equal to about 5 micrometers, for example).

SiC photodiodes typically have DC output components with large dynamic ranges on the order of about 5000 to 1 or greater. Furthermore, SiC photodiodes have AC output components that can be used to track flame dynamics that produce acoustic vibrations, for example. Additionally, SiC photodiodes have sufficiently high sensitivity to monitor flames even when oil fuel is used and/or steam injection is applied for power augmentation.

With specific reference to FIG. 3, the photodiode digits are structurally in the form of a substantially flat top mesa elevation profile 30. As shown, the mesa 30 has straight walls, which are perpendicular to the horizontal plane of the SiC surface. In the embodiment, the height of the mesa can be 0.1 to 3.0, desirably 0.3 to 1.0 and preferably 0.6 to 0.8 microns. The width of the mesa can range from 5 microns to 300 microns, desirably 20 microns to 200 and preferably, this range is between 40 and 100 microns. The active photosensitive area of the photodiode is the top surface area of the photodiode, which is sensitive to UV light.

A semiconductor mesa can be formed by etching approximately 5000 Angstroms deep into a SiC substrate. Suitable dry etching processes for this step include reactive ion etching (RIE) and inductively couple plasma enhanced RIE. The depth of etching to form the mesa finger or digit is approximately 0.5 microns, but can range from 0 to several microns, depending on epitaxial layer thickness. An additional etching process used to thin the top n+ epilayer is referred to as "mesa thinning." Mesa thinning makes the light absorption occur further into the SiC material, with regard to depth.

Referring again to FIGS. 1 to 3, photodiode 14 is complementary in shape and structure to photodiode 12. However photodiode 14 is associated with integral filter 16. The filter 16 prevents light (photons) of certain energies from reaching the region inside the semiconductor near interface 34 between n+ epitaxial layer 40 and p-layer 42, which is the photodiode active area. Integral filter 16 is compatible with high temperature operation (for example, equal or above about 302° F. (150° C.)). The filter 16 comprises silicon oxide and silicon nitride, either mixed together in the form of silicon oxynitride or as separate films. In other embodiments, the filter 16 can comprise multiple alternating layers of silicon oxide $SiO_2$ and hafnium oxide $HfO_2$ films. For example starting with silicon oxide, forty one alternating layers of silicon oxide and silicon nitride can be deposited to a total coating thickness of about 3.0 microns to form a high pass filter. The films can be deposited by computer-controlled chemical vapor deposition.

Another useful type of filter, comprises aluminum gallium nitride (AlGaN). Using an aluminum gallium nitride filter with a silicon carbide photodiode is advantageous because aluminum gallium nitride semiconductors are direct bandgap materials with a sharp transition between optical opaqueness and optical transparency. Thus, a combined photodiode device can have the benefits of silicon carbide photodiode ease of manufacturability and performance properties and the benefits of aluminum gallium nitride optical transition properties. In one embodiment, an integral aluminum gallium nitride filter is epitaxially grown to a thickness of about two micrometers with a concentration of aluminum ranging from about fifteen percent to about thirty-five percent or more specifically, from about twenty percent to about twenty five percent. In another embodiment, the aluminum gallium nitride filter is not integral to the photodiode and instead is deposited on a transparent substrate (not shown). In either embodiment, photons with wavelengths shorter than about 310 nanometers are absorbed by the filter and wavelengths longer than about 310 nanometers pass through the aluminum gallium nitride filter and are absorbed by the silicon carbide photodiode.

With further reference to the cut away side view of FIG. 3, sensor 10 includes n+ layer 40, p- layer 42, p layer 44 and SiC transition layer 46 on substrate 18. The layer designations represent various types and degrees of layer doping. The "p" doped epilayer 42 is shared by photodiodes 12 and 14. The photodiode chip is etched down and into this layer to near the n$^+$/p$^-$ interface to form the interdigitated photodiodes. This etched area is called the depletion area 50 or the depletion region. The depletion area 50 is immediately adjacent (to within about 2 microns) to both photodiodes 12, 14.

"Cross talk" is a confounding effect from absorption of one photodiode and signal generation in another. "Diffusion length" is a statistically averaged distance a minority free charge carrier can travel in SiC before recombining with a hole or electron. The diffusion length of. electrons in a p-type semiconductor layer or holes in an n-type semiconductor layer can be about 3 microns. The interdigitated photodiodes should be separated to exceed the diffusion length and minimize or avoid cross talk.

On the other hand, separating the interdigitated photodiode structures decreases UV light absorption area across a given sensed area. Separation diminishes the active area intended for UV absorption of UV light diminishes. This results in a reduction of detector light collection, detector signal levels and ratio accuracy. Correct separation can be determined from device modeling data to balance cross talk minimization and light collection optimization.

In FIG. 1 and FIG. 3, the depletion area 50 is designed to provide a distance "X" between photodiodes 12 and 14 that is greater than the diffusion length of electrons to electrically isolate the photodiodes 12, 14. Spacing "X" allows the separate interdigitated photodiodes to collect separate and distinct signals. The distance X is greater than 2 microns to prevent "cross-talk", or mixing of signals between diodes. On the other hand X is small enough (less than 200 microns) to avoid chip area waste. A desired distance is 2.5 microns to 50 microns and a preferred distance is 2.75 to 5.0 microns. The layers of differently doped material create a built-in electrical field at the depletion region 50. This depletion region 50 enhances the efficiency at which generated free carriers (holes and electrons) are collected in current.

Substrate 18 can be 4H or 3C, preferably 6H. Transition layer 46 minimizes effects of defects in the upper epitaxial layers. The transition layer 46 can have a thickness of 1.5 microns. It is doped approximately the same way as the epitaxial layer above it. Transition layer 46 also serves to block diffusion of impurities that are incorporated during the SiC (substrate) growth process.

The photodiodes can use light blocking elements (not shown) in the form of metal strips so that the area between the photodiodes will not absorb light, and therefore not generate signal. It is in these areas where absorbed light would otherwise create electrical signals, thereby confounding the signal of the individual photodiodes, and therefore confounding the temperature determination.

Figure 4:
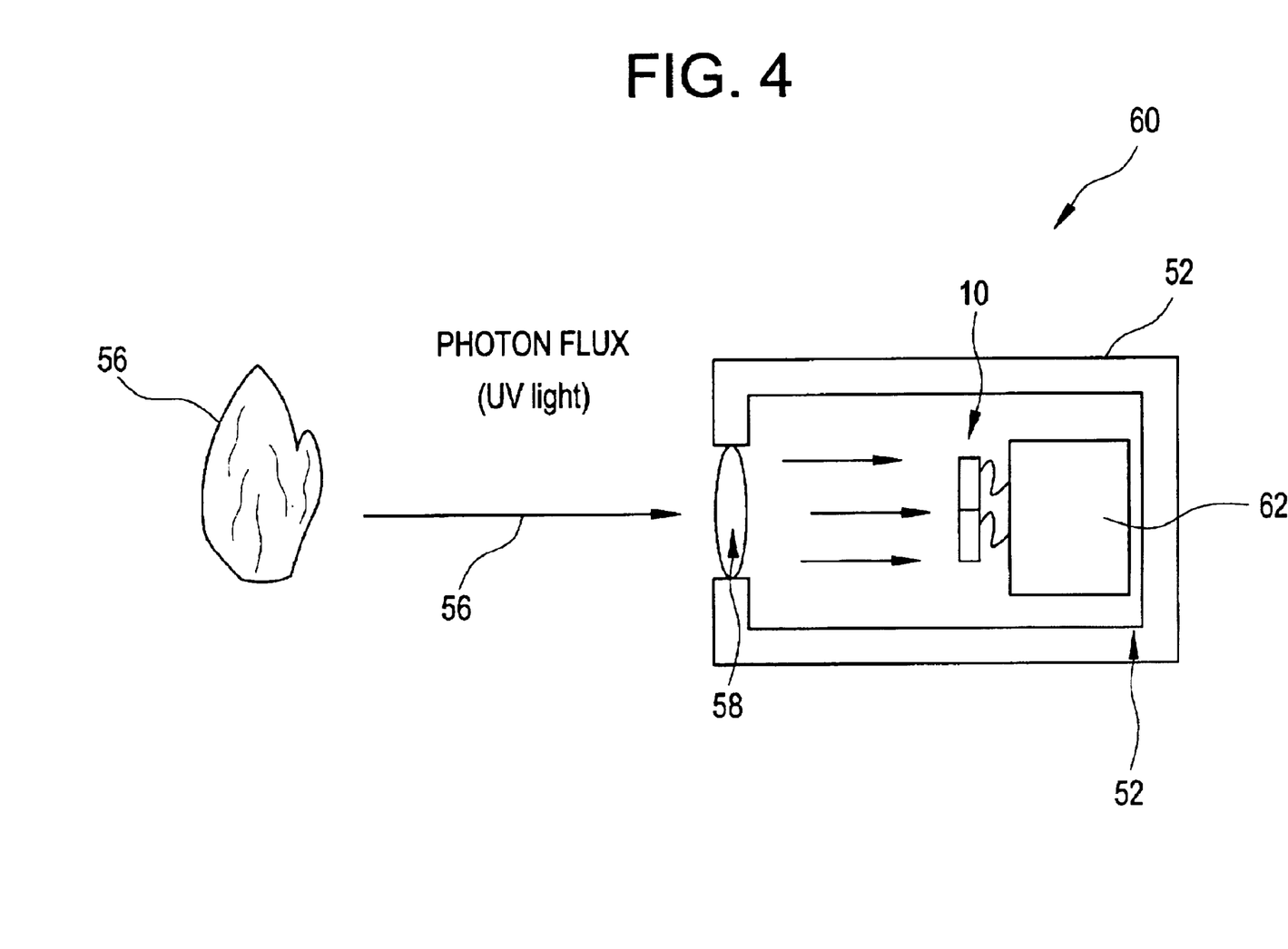
FIG. 4 is a schematic cross sectional view of a flame sensor in a housing.

FIG. 4 is a schematic cross sectional view of a photodiode optical spectrometer 60 that includes flame sensor 10 within a housing 52 for positioning to sense turbine flame 54. Further with reference to FIG. 1, FIG. 2, FIG. 3 and FIG. 4, contact pads 36 and 38 provide bonding locations for wire leads to supporting circuitry 62. Anode 28 shown in FIG. 1 and FIG. 3 is on the back, or substrate 18 side of the device. Anode 50 also includes a contact pad (not shown) and is shared by the two photodiodes 12 and 14. Incident photon flux 56 is absorbed by sensor 10. The absorbed photons generate free electric charge carriers, which are collected by cathodes 24, 26. Cathode 24, 26 geometry should be such that this thick, opaque metal is placed only over the top of a respective digit 20, 22, over a small percentage of surface area so as not to block light from reaching active areas of the remainder of the photodiode 12, 14. This percentage could range from 5% to 95%, a desired range 8% to 20% and a preferred range is between 10 and 15%, allowing light to penetrate 80% of the surface in the active region.

In operation, the interdigitated photodiode sensor 10 of the optical spectrometer 60 is positioned near the center of an incident light beam for maximum light collection from the object of interest (e.g. a flame). In FIG. 4, Lens 58 provides an optical coupling between the combustion flame UV light 56 and the sensor 10. Combustion flame UV light 56 passing through lens 58 is sensed by flame sensor 10. As illustrated in FIG. 4 together with FIG. 5, electronic circuitry indicated generally at 60 and computer 68 convert sensed incident photons to a ratio signal and convert the ratio signal to a flame temperature.

Figure 5:
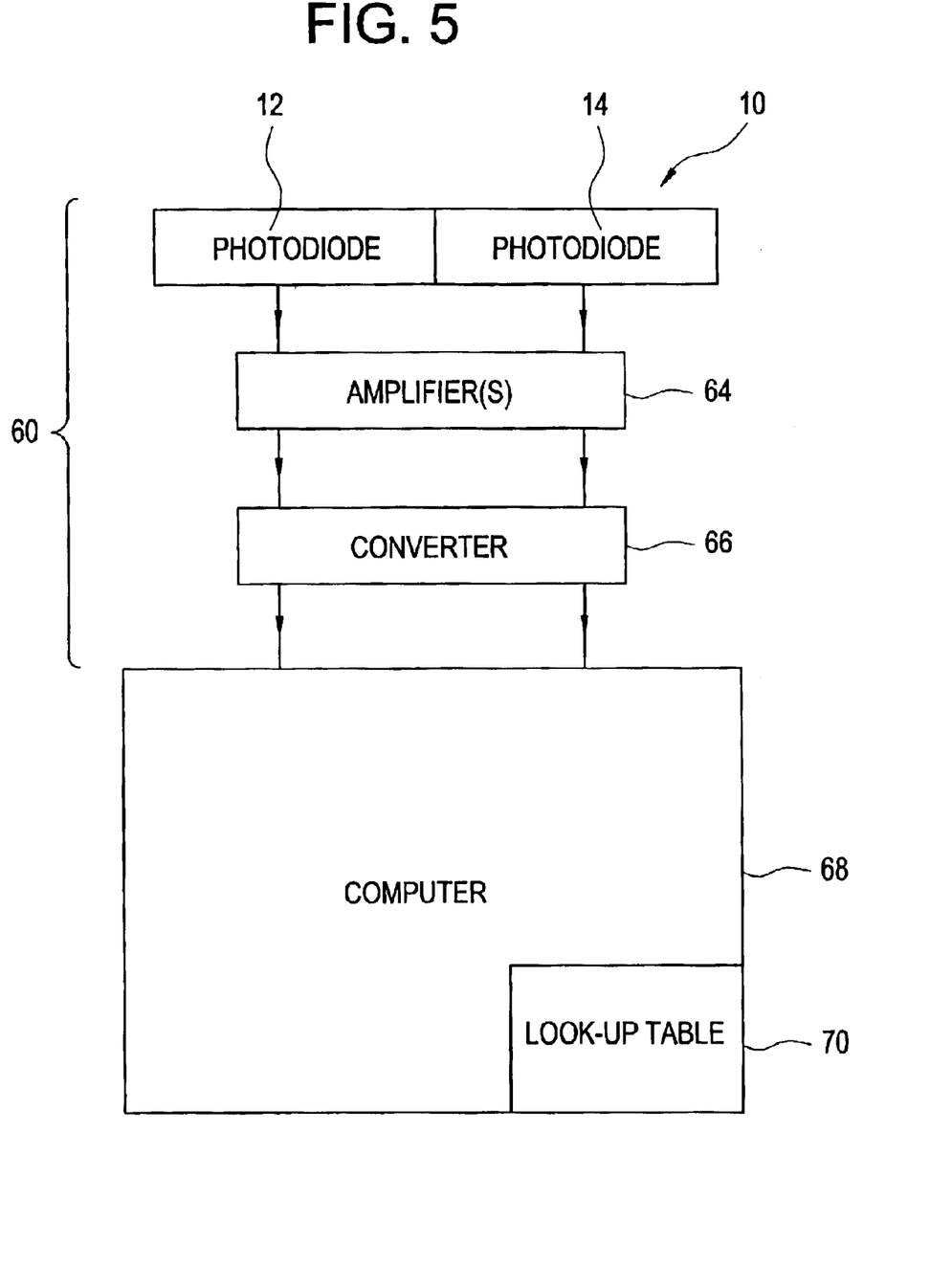
FIG. 5 is a diagram of a system and method to sense and determine combustion flame temperature.

FIG. 5 is a diagram of a system and method to sense and determine combustion flame temperature with the photodiode optical spectrometer 60 of FIG. 4. In this embodiment, a interdigitated dual photodiode optical spectrometer 60 for combustion flame temperature determination comprises sensor 10 with first silicon carbide photodiode 12 having a range of optical responsivity in an OH band for obtaining a first photodiode signal, and a second silicon carbide photodiode 12 for obtaining a second photodiode signal. The second photodiode 12 has a range of optical responsivity in a different and overlapping portion of the OH band than the first photodiode. signal amplification can be provided by sending signals from the photodiodes 12, 14 into amplifier(s) 64 (one multiplexing amplifier or a number of separate amplifiers). The spectrometer 60 further includes at least one analog-to-digital converter 66 for converting the amplified signals from analog signals to digital form. Computer 60 calculates a ratio using the amplified and converted first and second photodiode signals. After the ratio is obtained, computer 68 can use a look-up table 70 for using the ratio to determine the combustion flame temperature, for example. The look-up table is expected to have sensitivity adequate for detecting about ±20° F. (11° C.) changes in flame temperature. More specifically, the change in ratio R(T) for each 20° F. (11° C.) change in temperature is expected to be about 1%.

Focusing lens 58 produces a spatially nonuniform (Gaussian) incident light intensity distribution, i.e., the intensity varies as a function of distance from the center of the lens focal point. As a result, incident light intensity is non-uniformly distributed to sensor 10. Conventional multiple photodiodes receive incident light intensity that varies with each photodiode's location both with respect to the focused incident light and with respect to one another.

The symmetrical interdigitated structure overcomes these problems. The pitch (or distance between one photodiode digit to the next, 308) of the interdigitated filtered and unfiltered sections of the UV photodiode permits each photodiode section to collect the same amount of light regardless of position of the peak of the optical beam over a given section of the photodiode. Hence, the interdigitated structure provides a tolerance to misalignment of the optical beam from the center of the sensor chip by canceling out non-uniform light.

Additionally, the symmetrical interdigitated design permits positioning the sensor to sense the focal spot of incident light at the structure design center. Since, light intensity is greatest at the focal point, centering the symmetrical sensor at the focal point assures that the sensor will sense a maximum amount of light. This assures a more accurate signal determination, which results in improved temperature determination.

The interdigitated photodiode sensor provides accurate temperature measurement to reduce down-time, cost of repair and toxic NO, emissions.

While the SiC photodiodes are illustrated in the drawing embodiment because of advantages in using SiC, the invention is not limited to SiC or to other illustrated and described features of the drawings. For example, GaN, AlGaN, InGaN, AlInGaN, GaAsP or UV-enhanced Si can be used to form the sensor. Or, the sensor can be formed from two or more different materials, such as $Al_xGa_{1-x}N$ and GaN or $Al_xGa_{1-x}N$ and $Al_yGa_{1-y}N$, where x is not equal to y. The invention includes changes and alterations that fall within the purview of the following claims.

What is claimed is:

1. A flame sensor for combustion flame temperature determination, comprising:

a first photodiode formed with elongated extending digits and having a range of optical responsivity within an OH band for producing a first output signal; and a second photodiode formed with elongated extending digits and having a range of optical responsivity in a different and overlapping portion of the OH band than the first photodiode device OH band for producing a second output signal;

wherein the elongated digits are positioned with parallel interdigitated longitudinal axis with respect to one another.

2. The flame sensor of claim 1, wherein the first photodiode comprises a plurality of elongated extending digits, the second photodiode comprises a plurality of elongated extending digits and respective elongated extending digits of the first photodiode are interdigitated with the elongated extending digits of the second photodiode.

3. The flame sensor of claim 1, wherein an elongated extending digit has a substantially flat top mesa elevation profile.

4. The flame sensor of claim 1, wherein an elongated extending digit has a substantially flat top mesa elevation profile from 5 microns to 300 microns in width.

5. The flame sensor of claim 1, wherein an elongated extending digit has a substantially flat top mesa elevation profile from 20 microns to 200 microns in width.

6. The flame sensor of claim 1, wherein an elongated extending digit has a substantially flat top mesa elevation profile from 40 and 100 microns in width.

7. The flame sensor of claim 1, wherein the elongated digits are separated by a spacing 2 microns to 200 microns.

8. The flame sensor of claim 1, wherein the elongated digits are separated by a spacing 2.5 microns to 50 microns.

9. The flame sensor of claim 1, wherein the elongated digits are separated by a spacing 2.75 to 5.0 microns.

10. The flame sensor of claim 1, wherein the second photodiode comprises a silicon carbide photodiode and an associated integral filter.

11. An optical spectrometer comprising the flame sensor of claim 1 and a lens optically coupled between the flame sensor and a combustion flame UV light.

12. A system for sensing a combustion flame temperature, comprising the optical spectrometer of claim 11 positioned for receiving light from a combustion flame and a computer for obtaining a ratio using the first and second photodiode signals and using the ratio to determine the combustion flame temperature.

13. The system of claim 12, wherein the computer includes a look-up table for using the ratio to determine the combustion flame temperature.

14. The system of claim 12, comprising an amplifier for amplifying one or more of the photodiode signals.

15. The system of claim 12, comprising a converter for converting one or more of the photodiode signals from analog signals to digital form.

16. A method for combustion flame temperature determination comprising: obtaining a first photodiode signal using a first photodiode device comprising a silicon carbide photodiode with elongated extending digits and having a range of optical responsivity within an OH band; obtaining a second photodiode signal by using a second photodiode device comprising a silicon carbide photodiode with elongated extending digits interdigitated with the elongated extending digits of the first photodiode and a filter, the second photodiode device having a range of optical responsivity in a different and overlapping portion of the OH band than the first photodiode device; and obtaining a ratio using the first and second photodiode signals and using the ratio to determine the combustion flame temperature.

17. The method of claim 16 wherein using the ratio to determine the combustion flame temperature comprises using a look-up table.

18. A method for fabricating a flame sensor for combustion flame temperature determination, comprising:

forming a first photodiode with elongated extending digits and having a range of optical responsivity within an OH band for producing a first output signal; and forming a second photodiode with elongated extending digits and having a range of optical responsivity in a different and overlapping portion of the OH band than the first photodiode device OH band for producing a second output signal; and positioning the elongated digits of the first photodiode and the second photodiode with parallel interdigitated longitudinal axis with respect to one another.

\* \* \* \* \*